United States Patent
Garcia et al.

(10) Patent No.: US 9,963,159 B1
(45) Date of Patent: May 8, 2018

(54) REMOVABLE DOLLY

(71) Applicants: Enrique Garcia, Hialeah, FL (US); Henry Garcia, Hialeah, FL (US)

(72) Inventors: Enrique Garcia, Hialeah, FL (US); Henry Garcia, Hialeah, FL (US)

( * ) Notice: Subject to any disclaimer, the term of this patent is extended or adjusted under 35 U.S.C. 154(b) by 0 days. days.

(21) Appl. No.: 15/234,815

(22) Filed: Aug. 11, 2016

(51) Int. Cl.
*B62B 1/00* (2006.01)
*B62B 1/14* (2006.01)
*B62B 5/00* (2006.01)
*B62B 1/26* (2006.01)

(52) U.S. Cl.
CPC .............. *B62B 1/142* (2013.01); *B62B 1/268* (2013.01); *B62B 5/0083* (2013.01)

(58) Field of Classification Search
CPC ........... B62B 1/142; B62B 1/268; B62B 1/14; B62B 1/10; B62B 1/26; B62B 3/04; B62B 3/10; B62B 3/108; B62B 5/0083; B62B 5/0086; B62B 5/0093
See application file for complete search history.

(56) References Cited

U.S. PATENT DOCUMENTS

| | | | | | |
|---|---|---|---|---|---|
| 1,103,486 | A | * | 7/1914 | Cobb | B62B 5/0083 280/47.131 |
| 3,717,357 | A | * | 2/1973 | Schaefer | B62B 5/0083 280/35 |
| 3,845,969 | A | * | 11/1974 | Nadeau | B62B 5/0083 280/47.131 |
| 3,861,662 | A | * | 1/1975 | Morse | B25H 1/00 269/152 |
| 4,270,741 | A | * | 6/1981 | Hurst | B25B 5/00 269/17 |
| 4,695,067 | A | * | 9/1987 | Willey | B62B 1/14 269/237 |
| 4,978,132 | A | * | 12/1990 | Wilson | B62B 3/108 269/17 |
| 5,378,103 | A | * | 1/1995 | Rolnicki | B62B 5/0083 269/905 |
| 5,899,650 | A | * | 5/1999 | Collins | B62B 3/108 280/47.11 |
| 6,264,184 | B1 | * | 7/2001 | Armstrong | B62B 1/268 269/17 |
| 6,663,123 | B1 | * | 12/2003 | Kovacs | B62B 1/142 269/133 |
| 8,100,419 | B2 | * | 1/2012 | Morisset | B62B 1/268 280/79.7 |
| 8,162,329 | B1 | * | 4/2012 | Openshaw | B62B 1/268 280/47.131 |
| 8,602,443 | B2 | * | 12/2013 | Moore | B62B 3/002 280/651 |
| 9,221,483 | B1 | * | 12/2015 | Bruch | B62B 5/0083 |
| 9,623,892 | B2 | * | 4/2017 | Roach | B62L 33/104 |
| 9,744,807 | B2 | * | 8/2017 | Willis | B60B 33/04 |

\* cited by examiner

*Primary Examiner* — James M Dolak
(74) *Attorney, Agent, or Firm* — Sanchelima & Associates, P.A.; Jesus Sanchelima; Christian Sanchelima

(57) ABSTRACT

A dolly for transporting doors and planks of different types using a spring loaded hinge assembly 20 with two arm holding assemblies 40, each mounted to a hinge leaf 22. The dolly is removably mounted at a predetermined location along the edge of the transported object. The frictional force exerted by the arm holding assemblies against the object keeps the dolly mounted to the latter. A wheel assembly is mounted to the arm holding assemblies.

4 Claims, 4 Drawing Sheets

REMOVABLE DOLLY

BACKGROUND OF THE INVENTION

1. Field of the Invention.

The present invention relates to dollies and, more particularly, to dollies for transporting objects with an edge such as doors, planks, gypsum, rock sheet, plywood boards and the like.

2. Description of the Related Art.

Several designs for dollies have been designed in the past. None of them, however, include a mechanism for removably attaching a dolly to the door or plank to be transported.

For the purpose of describing the invention, the object to be transported will be referenced to as a door. However, other similar objects or groups of objects can also be transported with the present invention, such as sheet rock and plywood sheets and the like. Doors are one of those objects. However, these dollies lack any means for removably mounting these devices to selected locations. Instead, a user has to move the door and cause it to land approximately at the location desired by the user. The dolly is resting on the floor and is unstable (it can move once contact is made with the door to be transported). Unless the user has help, he or she will typically use his or her leg to position the dolly while manipulating the relatively heavy objects to be transported. And, when then door is finally mounted on the dolly, it cannot easily be moved to another position along the edge of the door thereby requiring a user to compensate the imbalance while transporting the door. Also, the use of two or more dollies is very difficult, without help, since the conventional dollies will not be anchored at predetermined locations. Lastly, the conventional dollies, even if a user manages to mount the door on one or more dollies, will not stay attached to the edge of the transported door when a user finds a step, cable, or other interruptions of the substantially flat surface over which dollies are used. First, a user needs to have two dollies to effectively tilt the door by lifting the end encountering the interruptions. Second, once lifted the end, a conventional dolly will fall off or a user would require help to keep it in place.

The foregoing described drawbacks are overcome with the present invention providing for a removably mounted dolly that allows a user to locate it accurately along the edge of the object(s) being transported.

Other publications describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a dolly that can be removably attached to a door or plank or sheets of plywood (or other materials to easily transport).

It is another object of this invention to provide a dolly that can be accurately and readily mounted at precise locations along one of the edges of the objects to be transported.

It is still another object of the present invention to provide a dolly that can be effectively used by a user single handedly.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
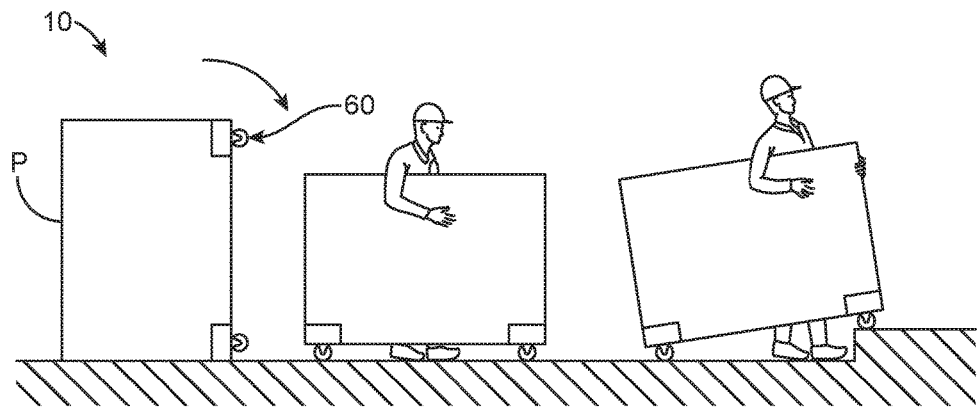
FIG. 1 represents a sequential illustration of the transportation of doors using the dolly claimed herein. The leftmost door is at rest and ready to be transported after the dollies have been removably mounted at predetermined locations. The door in the middle shows a user transporting a door over a flat surface. The rightmost door is shown with its front lifted as it approaches a step to be overcome with front dolly staying in place.

Referring now to the drawings, where a dolly representing present invention is referred to with numeral 10, it can be seen in use in FIG. 1. The present invention basically includes spring biased hinge assembly 20, arm holding assembly 40 mounted to leaf members 22 and wheel assembly 60 mounted to assembly 40, as seen in the embodiment shown in FIGS. 2; 3; 4A; and 5. Optionally, spacers 80 are snuggly inserted between plank P to which dolly 10 is mounted as seen in FIG. 4A. In the present application plank P will be equivalent to any object or group of objects that include at least one edge and sufficient adjacent area to permit the mounting of dolly 10. Thus, plank P will be understood to include doors, sheets of gypsum boards, plywood sheets, countertops, slabs and the like. As it can be seen in FIG. 1, dolly 10 can be mounted to a plank P at any desired location. In FIG. 1, two dollies 10 one used to transport plank P. Once mounted, dollies 10 stay in place as seen from the leftmost drawing. One more user is needed since dollies 10 stay in place. Plank P is transported over a substantially flat surface and steps can be readily overcome without dollies 10 coining off which typically requires the intervention of another person.

Figure 2:
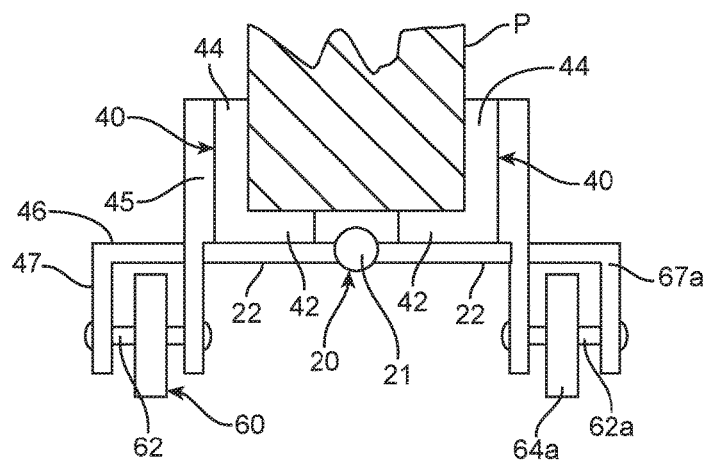
FIG. 2 shows an elevational end view for one of the preferred embodiments of the invention with a partial representation of a door in cross-section.

In FIG. 2 one of the embodiments for the present invention is shown with hinge pin 21 and pivotally mounted leaf members 22 of hinge assembly 20 completely distended but urged toward each other. This function of urging leaf member 22 against each other can be implemented with a spring member incorporated to loaded hinge assembly 20 such as those manufactured by Stanley Hardware (Stanleyhardware.com) referenced as model 2060R.

Arms holding assembly 40 comprises two L-shape beams each with one side 42 rigidly mounted (preferably welded) to leaf member 22 as seen in FIG. 2. The bias force of leaf members 22 is transmitted to sides 44 that extend perpendicularly from sides 42. Plank P is sandwiched by sides 44 and the fictional engagement permits a sufficient grip to keep side 44 in place. In this embodiment, a longitudinally extending wall 45 is rigidly mounted to the outer surface of side 44 and extend beyond the end of side 44 a predetermined distance, in one of the embodiments. A second L-shape beam having sides 46 and 47, Side 46 is perpendicularly mounted to wall 45 in this embodiment. It is to be understood that the perpendicular disposition of elements discussed above is not critical. Small deviations from an exact perpendicular disposition between sides 42 and 44 and sides 45 and 46 may still provide good results. An artisan or mechanic practicing the invention would attempt to achieve a substantially perpendicular disposition limiting the tolerance in the angular deviation to a small range of a few degrees. Good results are still obtained if the angular range goes from 85 to 95 degrees.

Hole 45b and 47b are aligned to each other and loaded at a predetermined distance from rods 45a and 47a, respectively, to cooperatively receive axle 62 of wheel assembly 60. Wheels 64 are rotably mounted to axles 62. Wheels 64 may include ball bearings to reduce frictional resistance.

Figure 3:
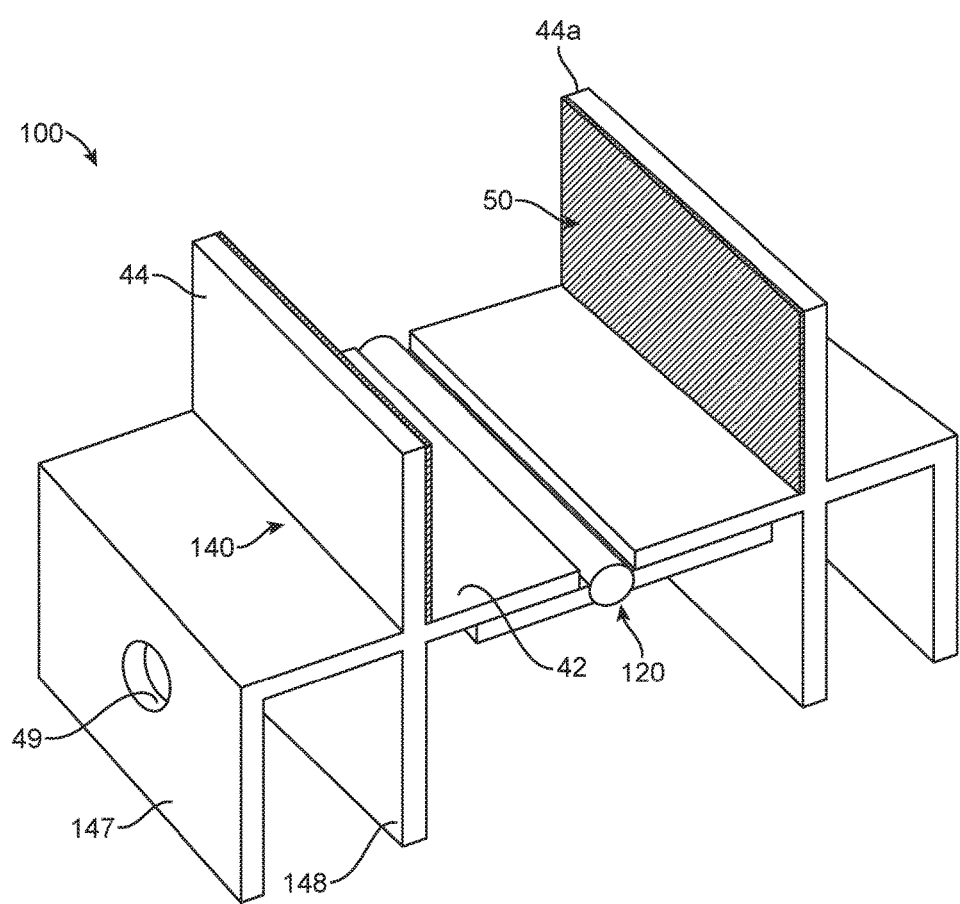
FIG. 3 illustrates an isometric view of a dolly subject of the present application.

In FIG. 3, an embodiment dolly 100 is shown with fully distended hinge assembly 120 and without a wheel assembly. In this isometric view opening 49 can be seen located in outer wall 147. Through opening 149 cooperatively positioned with an opposite aligned opening (not shown) to receive a wheel axle (not shown). In this embodiment, arm holding assembly 140 is an integrally built piece that can be manufactured as an extrusion. Padding 50 is shown mounted to the inner surfaces of side walls 44; 44a. Any kind of padding material is suitable provided that its not slippery.

Figure 4:
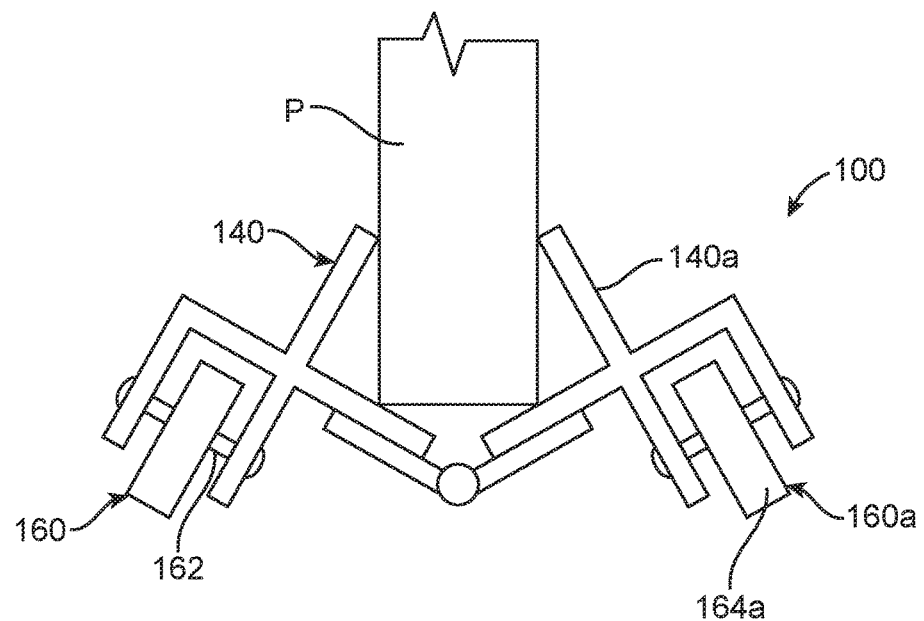
FIG. 4 is an end view representation of a dolly insulated to a door (partially represented) with the arms spring biased to urge against each other and sandwiching the door in between. The edges of the arms come in contact with the door.
Figure 4A:
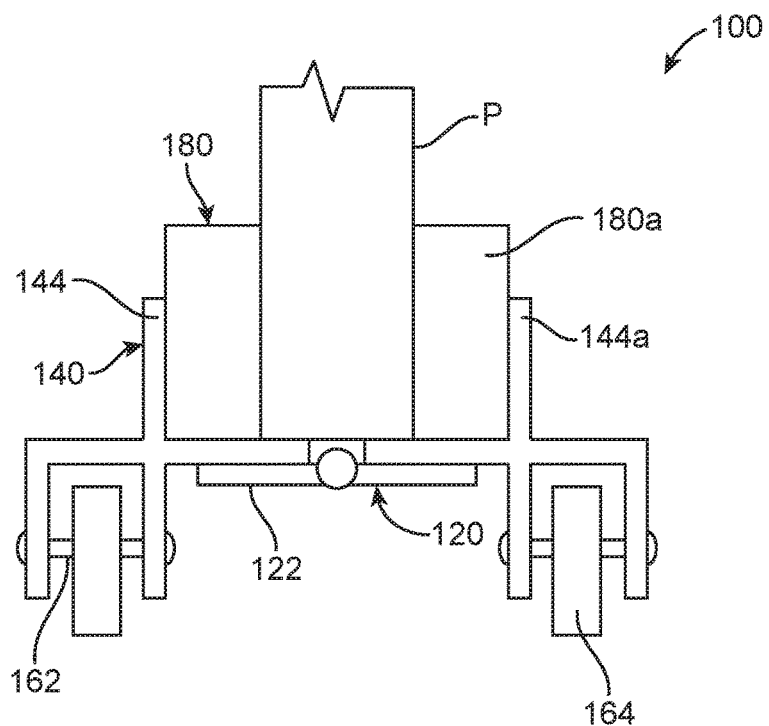
FIG. 4A is an end view representation of the dolly shown with previous figures utilizing spacers 180 and 180*a*.

FIG. 4 shows dolly 100 with wheel assemblies 160; 160a and arm holding assemblies 140; 140a exerting a force against the lower outer surfaces of plank P.

In FIG. 4A, the same dolly 100 is shown with space members 180; 180a inserted between the outer surfaces of plank P and the inner surfaces of side walls 144; 144a. Spacer members 180; 180a can be implemented with wood blocks or any other equivalent material that is not slippery. The dimensions of spacer members 180; 180a is cooperatively selected to keep plank P in place.

Figure 5:
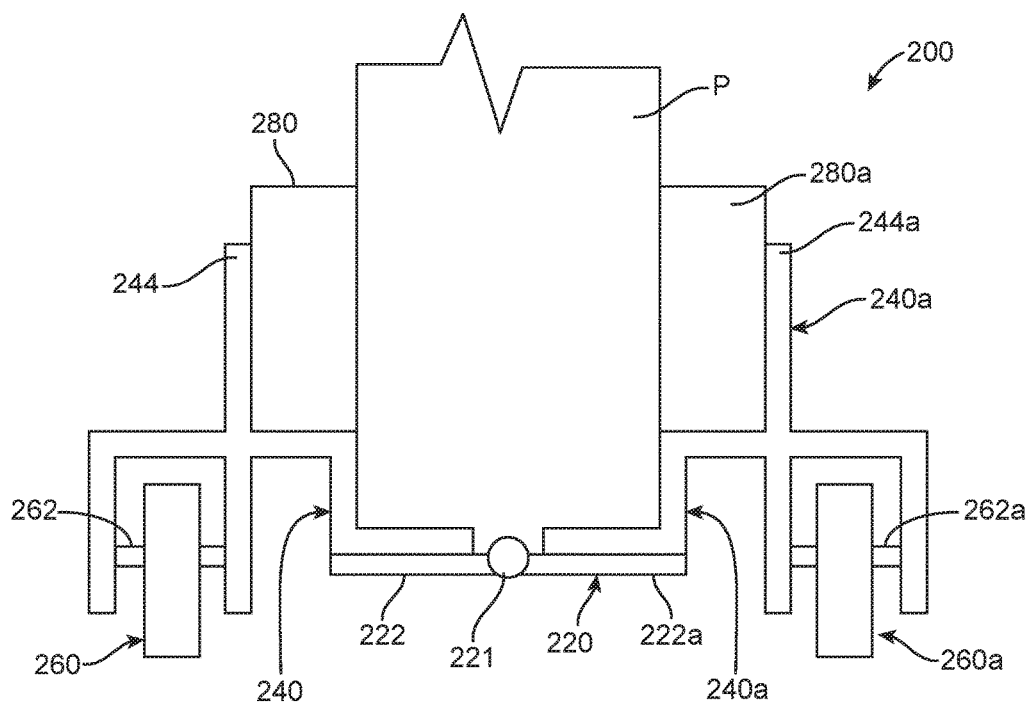
FIG. 5 shows an end view similar to the previous figure except that spacers 80 have been inserted between arms 40 to enhance the frictional engagement with door D.

FIG. 5 shows an alternate embodiment 200 with axles 262; 262a substantially aligned with hinge pin 221 of spring biased hinge assembly 220. Leaf members 222 and 222a extend outwardly from hinge pin 221 and the former causing sides 244 and 244a of arm holding assemblies 240; 240a to frictionally sandwich spacers 280; 280a and panel P. Wheels 260; 260a are rotably mounted to axles 262; 262a respectively. This feature is intended to bring the center of gravity of plank P lower than the one shown in FIGS. 3; 4 and 4A.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A dolly, comprising:
   (A) a spring-loaded hinge assembly (20) having first and second hinge leaves that are pivotally mounted to, and extending outwardly from, a hinge pin and further including a spring member for urging said first and second hinge leaves against each other;
   (B) first and second arm holding assemblies mounted to said first and second leaves, respectively, and said arm holding assemblies further including first and second elongated walls extending substantially perpendicularly with respect to said first and second leaves, said walls each including an inner facing surface, wherein said inner facing surface comes in contact with an object to be transported, wherein said object includes an edge with an adjacent outer surface; and
   (C) first and second wheel assemblies (60) are mounted to said first and second arm holding assemblies, respectively, so that said dolly is removably mounted to a predetermined location along the outer surface adjacent to said edge;
   wherein said first arm holding assembly and said second arm assembly are each formed of an L-shaped beam with an outer side wall extending perpendicularly below said first and second elongated walls, respectively, and each outer side having an opening for an axle of a respective wheel assembly.

2. The dolly set forth in claim 1 further including:
   (D) a pad assembly mounted to said inner facing surfaces to further enhance enhanced the grip of said arm holding assemblies to said object.

3. The dolly set forth in claim 1 further including spacer members to be snuggly inserted between said inner facing surfaces and said object thereby embracing the frictional engagement of frictionally engaging said dolly to said object.

4. The dolly set forth in claim 3 further including:
   (F) a pad assembly mounted to said inner facing surfaces to further enhance the grip of said arm holding assemblies to said object.

* * * * *